United States Patent

Blomdahl et al.

(10) Patent No.: US 6,481,589 B2
(45) Date of Patent: Nov. 19, 2002

(54) NON-DISPENSING CLOSURE

(75) Inventors: Cori M. Blomdahl, Muskego, WI (US); Susan De Groot, Pewaukee, WI (US)

(73) Assignee: Seaquist Closures Foreign, Inc., Crystal Lake, IL (US)

(*) Notice: Subject to any disclaimer, the term of this patent is extended or adjusted under 35 U.S.C. 154(b) by 3 days.

(21) Appl. No.: 09/791,078

(22) Filed: Feb. 22, 2001

(65) Prior Publication Data

US 2002/0113032 A1 Aug. 22, 2002

(51) Int. Cl.$^7$ .............................................. B65D 53/00
(52) U.S. Cl. ....................... 215/303; 215/305; 215/341; 215/343
(58) Field of Search .................................. 215/295, 303, 215/341, 343, 352, 329, 305

(56) References Cited

U.S. PATENT DOCUMENTS

| | | |
|---|---|---|
| 2,241,180 A | 5/1941 | Burke |
| 2,244,565 A | 6/1941 | Nast |
| 3,986,627 A | 10/1976 | Zapp |
| 3,990,598 A | 11/1976 | Zapp et al. |
| 4,335,068 A | 6/1982 | Hemery |
| 4,389,385 A | 6/1983 | Hendry |
| 4,416,602 A | 11/1983 | Neumeister |
| 4,440,820 A | 4/1984 | Shiho et al. |
| 4,458,819 A | 7/1984 | Geiger |
| 4,459,256 A | 7/1984 | Ziegler |
| 4,467,931 A | 8/1984 | Gach |
| 4,489,844 A | 12/1984 | Breskin |
| 4,500,218 A | 2/1985 | Nishikawa |
| 4,702,384 A | * 10/1987 | Weiser ........................ 215/295 |
| 4,754,892 A | * 7/1988 | Retief ........................ 215/329 |
| 4,776,501 A | 10/1988 | Ostrosky |
| 4,789,326 A | 12/1988 | Sorensen |
| 4,808,106 A | 2/1989 | Holdt |
| 5,105,959 A | 4/1992 | Kinsley |
| 5,125,916 A | 6/1992 | Morita |
| 5,192,005 A | 3/1993 | Zimmerman |
| 5,205,424 A | 4/1993 | Gasper |
| 5,236,107 A | 8/1993 | Spaanstra, Sr. |
| 5,273,177 A | 12/1993 | Campbell |
| 5,284,264 A | 2/1994 | Gross |
| 5,289,930 A | 3/1994 | Inouye |
| 5,294,385 A | 3/1994 | Hirota |
| 5,314,093 A | 5/1994 | Gross et al. |
| 5,328,058 A | 7/1994 | Leoncavallo et al. |
| 5,341,960 A | 8/1994 | Lay |
| 5,372,770 A | 12/1994 | Machida |
| 5,439,124 A | 8/1995 | Mock |
| 5,443,172 A | 8/1995 | Gabriele |
| 5,482,172 A | 1/1996 | Braddock |
| 5,503,303 A | 4/1996 | LeWare et al. |
| 5,629,029 A | 5/1997 | Souder et al. |
| 5,697,509 A | 12/1997 | Hayes |
| 5,700,500 A | 12/1997 | Wilhelm |
| 5,743,443 A | 4/1998 | Hins |
| 5,791,506 A | * 8/1998 | Sheffler et al. ............. 215/343 |
| 5,868,273 A | * 2/1999 | Daenen et al. ............. 215/341 |
| 5,927,566 A | 7/1999 | Mueller |
| 6,029,866 A | 2/2000 | Wood et al. |
| 6,142,325 A | * 11/2000 | Chomik ...................... 215/343 |

FOREIGN PATENT DOCUMENTS

| | | |
|---|---|---|
| EP | 0 570 276 A1 | 11/1993 |
| EP | 1065149 | * 1/2001 |
| GB | 1387064 | * 3/1975 |

* cited by examiner

*Primary Examiner*—Nathan J. Newhouse
(74) *Attorney, Agent, or Firm*—Wood, Phillips, Katz, Clark & Mortimer

(57) ABSTRACT

A closure is provided for a container. The closure includes a body which is mounted to the container. The body comprises a first, generally rigid piece which is molded from a material. A second piece is molded from a material onto the first, rigid piece and bonded to the first, rigid piece to define a portion of the periphery of the exterior of the closure, and the interior of the closure for sealing purposes, where desired.

7 Claims, 5 Drawing Sheets

FIG. 5
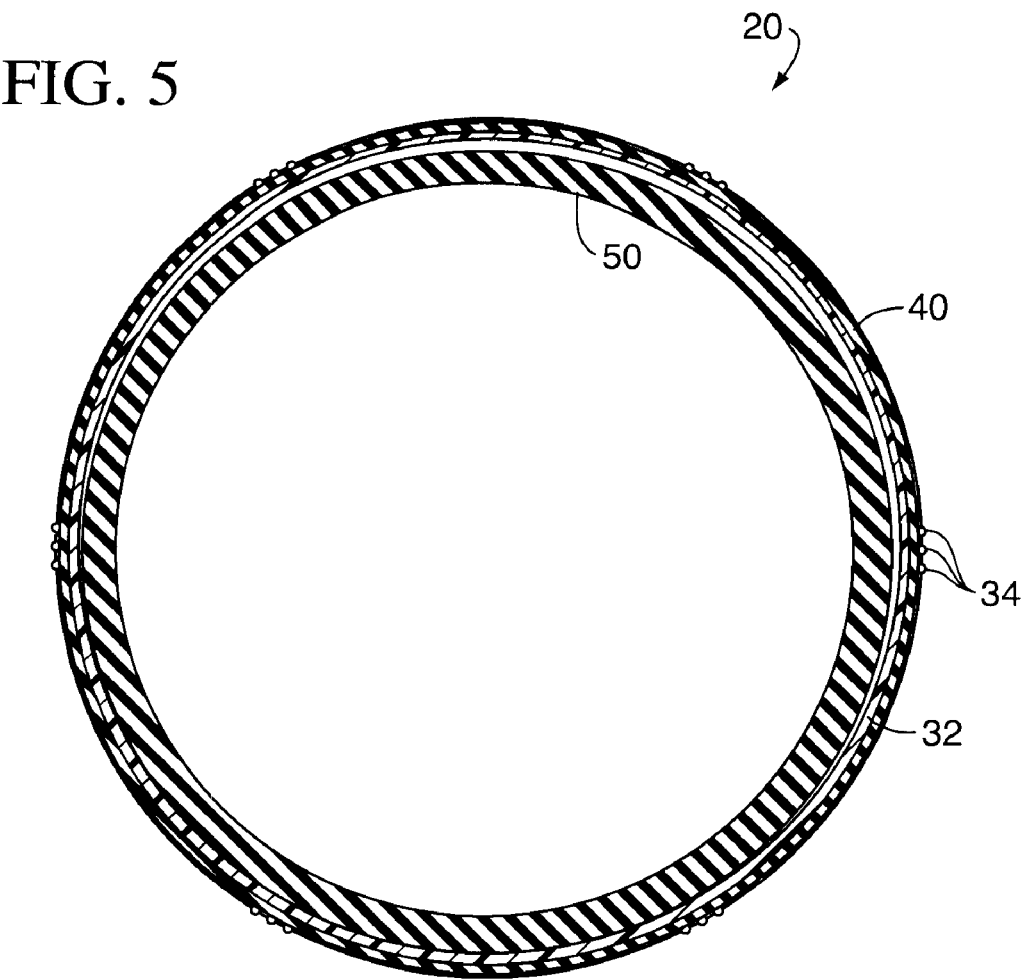
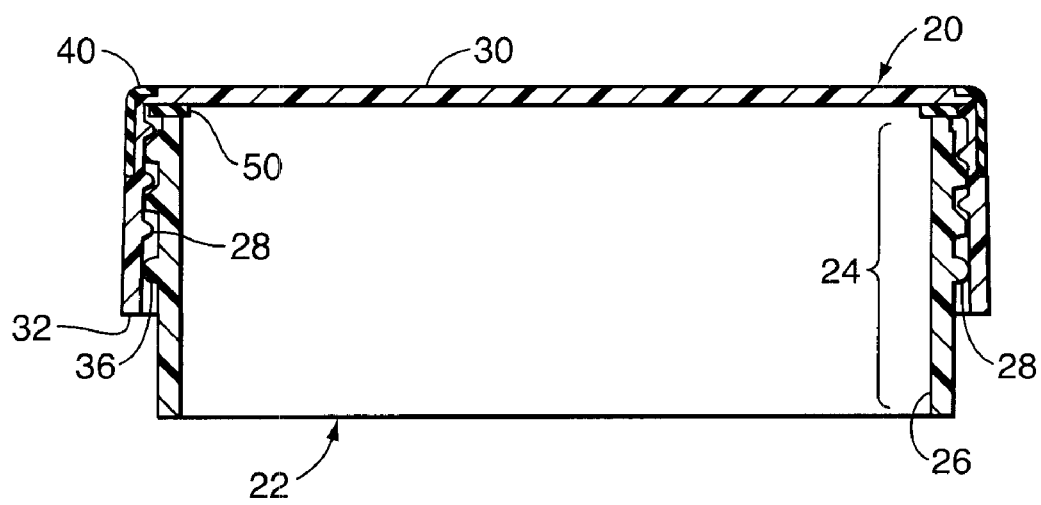
FIG. 6

NON-DISPENSING CLOSURE

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

This invention relates to a container closure which can be screwed on and off.

BACKGROUND OF THE INVENTION AND TECHNICAL PROBLEMS POSED BY THE PRIOR ART

A variety of packages that include closures or lids on containers have been developed for household products, personal care products, and other products. One type of package includes a container that is threaded around the container mouth or opening and includes a closure with a skirt having mating threads for threadingly engaging the container threads. It would be desirable to provide an improved closure for use with such packages.

Additionally, it would be advantageous if such an improved closure could incorporate a structure which could be more easily grasped by the user's fingers for opening the closure. It would be desirable in some applications to provide a closure which includes a structure in part of the closure that includes a color, texture, or material that is different from the color, texture, or material in the rest of the closure. In some applications, it may be especially desirable if part of a closure could be provided with such a structure made of material that is softer and/or less slippery than the rest of the closure or which otherwise feels different, or provides a different tactile sensation, than the rest of the closure. Preferably, such a structure should provide improved frictional engagement with the user's fingers under wet conditions so as to minimize the tendency of the finger to slip off of the closure. Preferably, such an improved closure should also desirably facilitate the removal or installation of the closure by a child as well as by an elderly person having impaired manual dexterity or reduced strength.

It would also be beneficial if such an improved closure could also accommodate, or actually contain, features which provide good sealing of the closure to the container by accommodating imperfections in the container finish.

It would also be advantageous if such an improved closure could accommodate a variety of aesthetically pleasing designs adaptable for use on various containers.

It would also be beneficial if such an improved closure could readily accommodate its manufacture from a variety of different materials.

Further, it would be desirable if such an improved closure could be provided with a design that would accommodate efficient, high quality, large volume manufacturing techniques with a reduced product reject rate.

Preferably, the improved closure should also accommodate high speed manufacturing techniques that produce closures having consistent operating characteristics unit-to-unit with high reliability.

The present invention provides an improved closure which can accommodate designs having the above-discussed benefits and features.

BRIEF SUMMARY OF THE INVENTION

According to one aspect of the present invention, a closure is provided for an opening to a container. The closure is especially suitable for use on a large or wide mouth container that contains a typical household product, such as a comestible product, personal care product, cleaning product, etc.

The closure is adapted for movement between a closed position occluding the opening and an open position spaced from the opening. The closure includes a body for being mounted to the container. The body comprises a first, generally rigid piece, which is molded from a material. The first piece may advantageously be molded from polypropylene which is generally rigid in its after-molded, completed condition.

A second piece is molded from a material onto the first, rigid piece and bonded to the first, rigid piece to define a portion of the periphery of the exterior of the closure. In a presently preferred embodiment, the second piece which defines a portion of the periphery of the exterior of the closure is molded from a rubber based, thermoplastic elastomer which is softer to the touch than is the material from which the first piece is molded. The second piece may advantageously have a different color than the first piece.

In a presently contemplated preferred form, the closure of the present invention is not connected to the container by a hinge and is adapted to be threadingly engaged with the container.

Further, it is presently contemplated that a preferred form of making the dispensing closure includes bi-injection molding techniques, although other molding techniques could be employed, such as two-shot molding, multi-injection molding, or over-molding. In general, the closure is made by injecting a first material, such as polypropylene, into the vacant cavity of an injection molding tool. During the first injection, part of the cavity is blocked to prevent the melt (e.g., the hot, flowable polypropylene) from filling certain regions of the cavity. The first material is then allowed to cool briefly. Subsequently, the blocking component or components are removed from the molding tool to expose the additional region or regions of the cavity volume. A second injection of thermoplastic material is then effected, typically with a different thermoplastic material than the first material. The second injection of the thermoplastic material fills the remaining, vacant region or regions of the cavity and bonds to the substrate material of the first injection.

The improved closure can be readily designed to provide an improved peripheral top surface region for being gripped by the user's fingers. The peripheral surface region may be softer than the rest of the closure and/or may provide increased friction to prevent slippage between the user's fingers and the closure. The peripheral surface region can also be readily provided with a different color, as well as a different texture or material, than the rest of the closure.

The improved closure can also be readily designed to provide a seal within the closure for sealing against the container around the container opening, and the seal can be composed of a material, and provided with a configuration, that accommodates imperfections in the container finish so as to provide good sealing notwithstanding such imperfections.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same.

FIG. 5 is a cross-sectional view taken along the plane 5—5 in FIG. 3;

FIG. 6 is a view similar to FIG. 4, but FIG. 6 shows the closure installed on a container;

DETAILED DESCRIPTION

Figure 1:
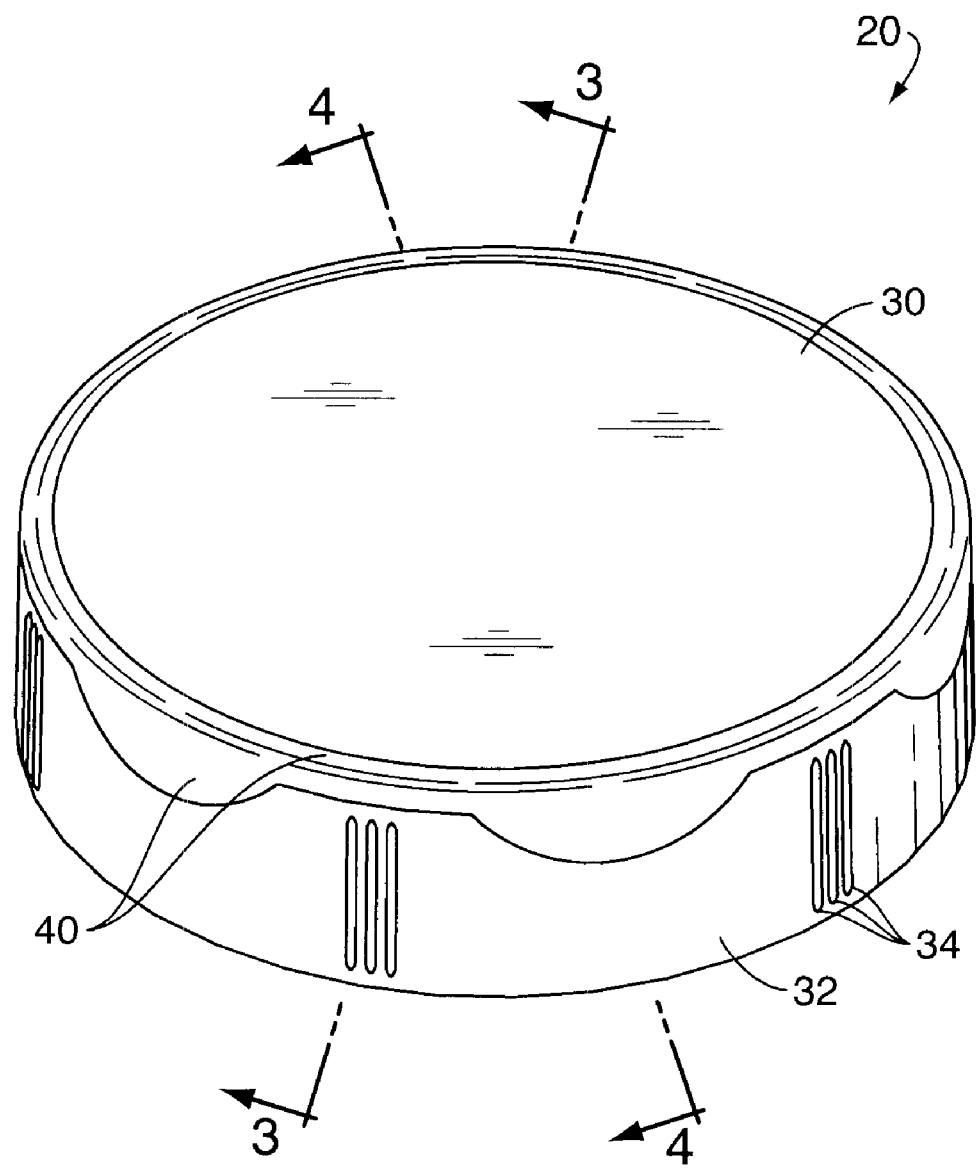
FIG. 1 is a top perspective view of a first embodiment of the closure of the present invention.
Figure 2:
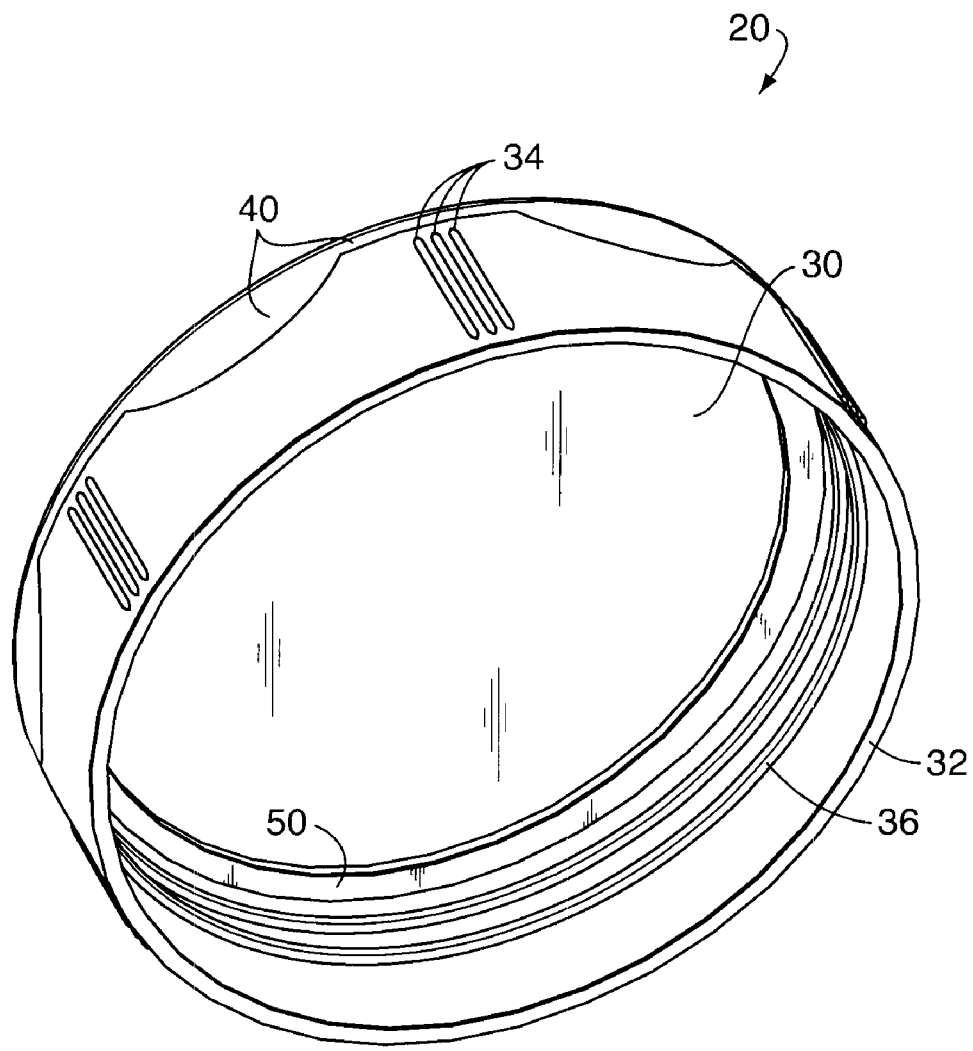
FIG. 2 is a bottom perspective view of the first embodiment of the closure.

While this invention is susceptible of embodiment in many different forms, this specification and the accompanying drawings disclose only some specific forms as examples of the invention. The invention is not intended to be limited to the embodiments so described, and the scope of the invention will be pointed out in the appended claims.

For ease of description, the closure of this invention is described in a typical upright position, and terms such as upper, lower, horizontal, etc., are used with reference to this position. It will be understood, however, that the closure may be manufactured, stored, and used in orientations other than the one described.

A presently preferred, first embodiment of a closure of the present invention is illustrated in FIGS. 1–6 and is designated generally therein by the reference numeral 20. The closure 20 is adapted to be mounted on a container 22 (FIG. 6). The container 22 may have any suitable configuration. The container 22 may have a lower, body portion (not visible in FIG. 6) and an upper, neck portion 24 that defines an opening 26 and an exterior, male thread 28. The neck portion 24 may have a different cross-sectional configuration than the body portion. The portion 24 may have a cross section that is smaller or larger than the body portion. The cross-sectional shape and size of the neck portion may also be the same as the cross-sectional shape and size, respectively, of the body portion so that the neck portion and body portion are not distinguishable from each other except for the thread 28 on the neck portion.

The neck portion 24 need not have a thread 28. Other means for attaching the closure 20 of the present invention to the container 22 could be provided, such as, for example, a releasable snap-fit engagement, friction-fit engagement, or other engagement system.

The container 22 may be a flexible container or may be a substantially rigid container. So long as the container 22 has an opening 26 and a structure for receiving a closure to occlude the opening, the detailed design and operation of the container 22 form no part of the present invention.

As shown in FIG. 1, the closure 20 includes a body comprising a first material which, in the preferred configuration, defines at least part of a generally horizontal top wall or deck 30 and at least part of a depending skirt 32. The skirt 32 preferably includes a plurality of groups of vertical ribs 34 spaced around the periphery of the closure. The ribs 34 may provide aesthetic design elements and/or may function to provide increased rigidity of the skirt 32. Another function of the ribs 34 is to aid the capping machine in applying the closure to the container.

The interior of the skirt defines a thread 36 for threadingly engaging the container thread 28 as shown in FIG. 6. It will be appreciated, however, that the closure skirt 32 need not have a thread 36, but may instead be provided with other means for engaging a specific finish on a container. Such other engagement means could include a releasable snap-fit bead or groove on the skirt 32 for engaging a mating releasable snap-fit groove or bead, respectively, on the container. Alternatively, a simple friction-fit engagement could be provided. Further, other, different means for releasably mounting the closure 20 to the container 22 could be provided. The specific means for mounting the closure 20 to the container 22 form no part of the present invention.

A portion of the closure body is molded from a material to form a first, generally rigid piece which includes portions of the deck 30 and skirt 32. The rigid piece may be molded from a material which is generally substantially rigid after it has been molded, such as a thermoplastic material. A presently preferred thermoplastic material for molding the first, rigid piece is polypropylene.

Figure 3:
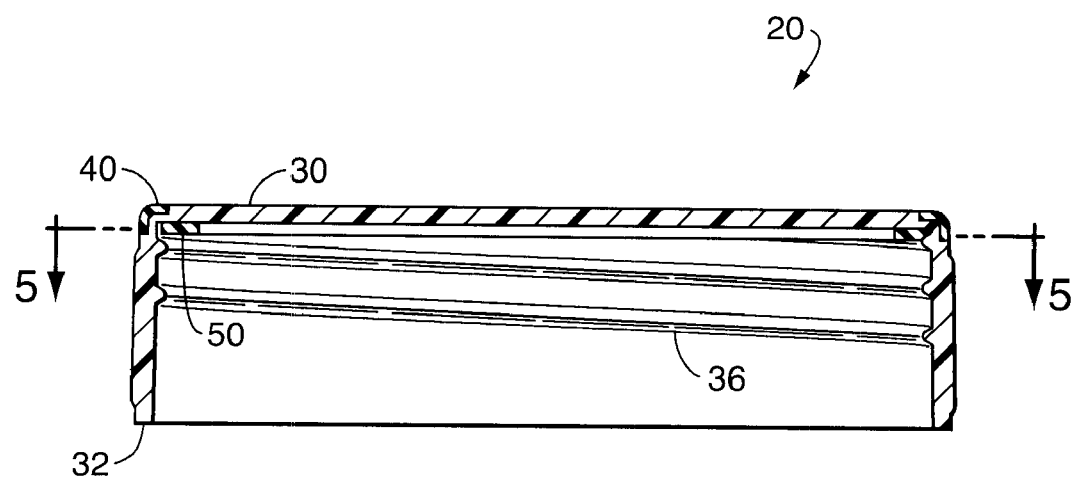
FIG. 3 is a cross-sectional view taken generally along the plane 3—3 in FIG. 1.
Figure 4:
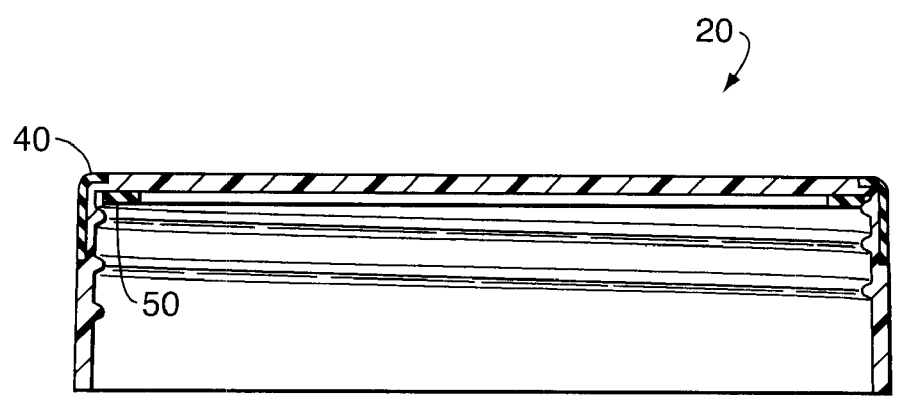
FIG. 4 is a cross-sectional view taken generally along the plane 4—4 in FIG. 1.

A second piece is molded from a material onto the first, rigid piece and is bonded to the first, rigid piece to define a portion of the periphery of the exterior of the closure. In FIG. 3, the second piece includes an exterior, peripheral portion 40. As can be seen in FIG. 1, the exterior peripheral portion 40 has a plurality of alternating narrow and wide portions around the periphery of the closure 20.

A third piece 50 may be molded on an interior region of the closure as shown in FIG. 3. The third piece 50 is preferably molded in the form of an annular seal for engaging and sealing against the top of the container 22 as shown in FIG. 6.

In the presently preferred contemplated embodiment, the second piece 40 and the third piece 50 are molded from a rubber-based, thermoplastic elastomer so as to be bonded to the first, rigid piece.

The pieces 40 and 50, if molded from a rubber-based, thermoplastic elastomer, may advantageously be softer compared to the first, rigid piece comprising the rest of the closure 20. This will provide the portion 40 with a pleasant tactile sensation for the user and can further function to provide greater frictional engagement between the periphery of the closure 20 and the user's fingers. This may be especially helpful when the closure is mounted on a container for a product which is typically used in a shower or bathroom where the user's hands may be wet. Small children and elderly people may find that the softer peripheral portion 40 facilitates gripping and opening of the closure 20 regardless of whether or not the closure or their hands are wet.

In a preferred form of the closure 20, at least the second piece 40 has a different color than the color of the material used to form the rigid, first piece of the closure. This will more readily distinguish the finger gripping region from the rest of the closure and will provide the user with a readily apparent indication of what part of the closure may be easily gripped to open the closure.

The third piece 50 is formed of a soft material so as to provide some elasticity or deformability so that the material 50 can function as a seal to readily accommodate imperfections in the container finish and therefore provide improved sealing when the closure 20 is fully mounted on the container 22 as shown in FIG. 6.

If desired, the third piece in the form of the annular seal 50 may be omitted from the closure, and the underside of the first rigid piece deck 30 may seal directly against the top of the container.

In the presently preferred form of the closure, the closure is formed by a molding process of bi-injection, two-shot molding, multi-injection molding, or over-molding. Descriptions of multi-shot, multi-material injection molding techniques are set forth in "Multi-Material Injection Saves Time, While Cutting Costs," MODERN PLASTICS, Mar. 19, 1994 (author: Peter Mapleston), in "Molding Many Parts Into. One," PRODUCT DESIGN AND DEVELOPMENT, Dec. 19, 1995, page 16 (author: Jay Rosenberg), and in U.S. Pat. No. 5,439,124. The European Patent No. 0 570 276 discloses how an internal mold element 12 can be repositioned to accommodate the molding of a second material into a ring 8 against a closure body previously molded from a first material.

Preferably, a bi-injection molding process is employed. Specifically, the portion of the closure which does not include the second piece 40 and third piece 50 is molded as a first piece from a first material, such a polypropylene, in a cavity of a mold assembly or tool. Part of the cavity is blocked with removable blocking members to prevent the hot, flowable polypropylene from filling the portions or regions of the cavity where the pieces 40 and 50 will be subsequently located. The first material is allowed to cool briefly. Subsequently, the blocking members are removed to expose the additional regions of the mold cavity. The second material, such as a rubber-based, thermoplastic elastomer, is injected into the remaining vacant regions of the cavity. This is allowed to cool to become attached or bonded to the first piece of the closure with a weld defined by the interface solidification of melted portions of the second and/or first materials. The completed closure may then be removed from the mold assembly.

Although the closure is molded from a first injection of material and from a subsequent second injection of material to simultaneously form the second and third pieces, the material employed in both the first injection and the second injection could be the same material. Typically, however, the piece 40 (and piece 50 if employed) would contrast with the first, rigid piece of the closure 20. This contrast may be effected by simply providing the piece 40 (and piece 50 if employed) with a different color-even though the first rigid piece is molded from the same material as the second piece 40 (and third piece 50 if employed). Alternatively, however, the contrast between the piece 40 (together with the piece 50 if employed) and the rigid, first piece could be provided by using two different materials which may have the same color but which have different surface textures. Various textures may be molded into the second piece 40 on the exterior of the periphery of the closure 20. Additionally, the piece 40 (and piece 50 if employed) may be provided with indicia molded directly into the material, and such indicia may include symbols, words, logos, etc.

The present invention also contemplates that a third material, or even more materials, may be molded with multi-injection processes to form a closure comprising three or more materials. Alternatively, one material may be molded in two, or three, or more separate injections to provide a multi-injection molded closure. Where the same material is employed in two or more injections, the material may have different colors or textures for each of the different injections.

If desired, the second piece 40 on the exterior periphery of the closure 20 may be provided with heavy knurling or other, relatively aggressive patterns to facilitate gripping of the closure. In addition, a protrusion, such as an upstanding tab (not illustrated), may be molded into the top of the closure. Such a tab may project upwardly from the deck 30 to facilitate gripping and turning of the closure 20. The exterior, surface portions of such a gripping tab may be formed with a different material, such as the material comprising the piece 40 and/or comprising the piece 50. Preferably, such an additional material on a gripping tab would be relatively soft so as to facilitate gripping.

Figure 7:
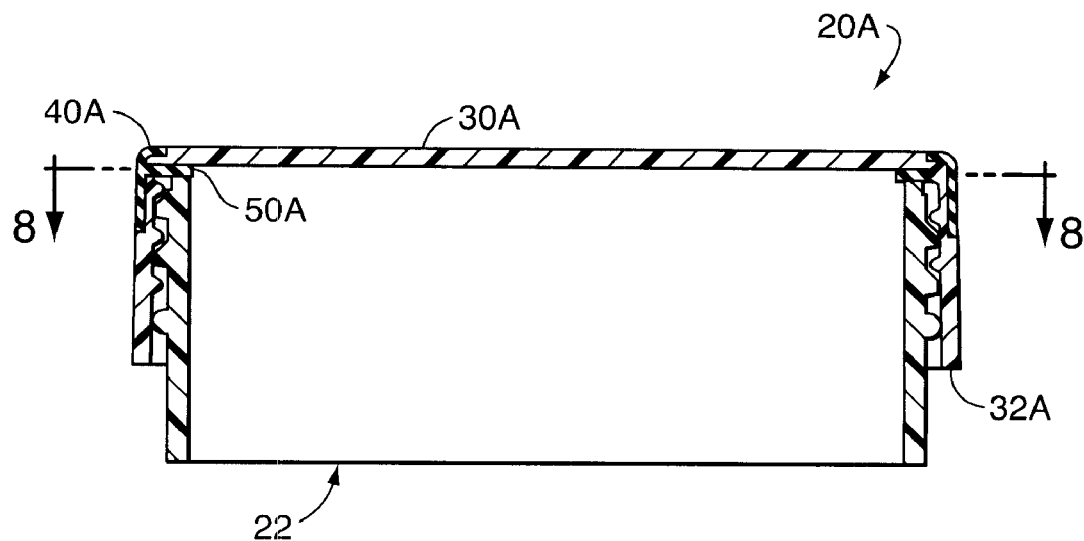
FIG. 7 is a view similar to FIG. 6, but FIG. 7 shows a second embodiment of the closure of the present invention installed on a container.
Figure 8:
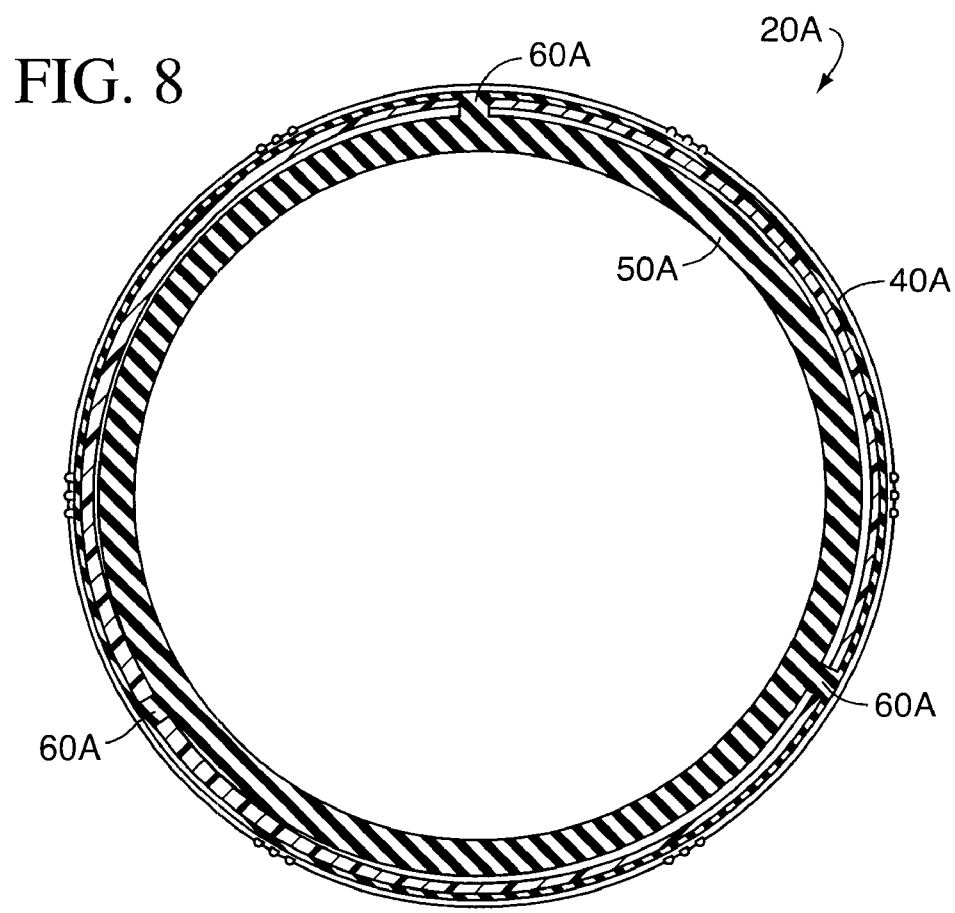
FIG. 8 is a cross-sectional view taken generally along the plane 8—8 in FIG. 7.

A second embodiment of the closure of the present invention is illustrated in FIGS. 7 and 8 and is designated therein generally by the reference number 20A. The second embodiment 20A is similar to the first embodiment 20 illustrated in FIGS. 1–6 and described above. The second embodiment of the closure 20A is adapted to be mounted to the container 22, as for example, with a threaded engagement such as employed in the illustrated first embodiment of the closure 20 and described above.

The closure 20A includes a body having a first, generally rigid piece which includes a skirt 32A and a top wall or deck 30A.

A second piece is molded from a material onto the first, rigid piece, and the second piece includes an exterior peripheral portion 40A and an interior portion 50A. The second piece includes at least one branch portion 60A extending through the first rigid piece from the exterior side to the interior side to connect the second piece exterior portion 40A with the second piece interior portion 50A. FIG. 8 illustrates three such branch portions 60A equally spaced about the closure at 120 degree increments.

The second piece exterior portion 40A can function as a gripping surface and/or as a structure which provides an aesthetic design element. The portion 40A may also include indicia providing information relative to the operation of the closure, relative to the container contents, or the like.

The interior portion 50A preferably functions as a seal against the top of the container 22. To that end, the second piece material is preferably molded from a soft material, such as a thermoplastic elastomer, to form the interior portion 50A and the exterior portion 40A.

Preferably, the second embodiment of the closure 20A is molded by a bi-injection molding process similar to that described above for the process of molding the first embodiment of the closure 20. Because the second embodiment of the closure 20A has branches 60A connecting the interior portion 50A with the exterior portion 40A of the second piece, all portions of the second piece (i.e., the interior portion 50A, the exterior portion 40A, and the connecting branches 60A) can readily be molded together in one injection of material after the first, rigid piece of material has been molded.

It will be readily observed from the foregoing detailed description of the invention and from the illustrations thereof that numerous other variations and modifications may be effected without departing from the true spirit and scope of the novel concepts or principles of this invention.

What is claimed is:

1. A closure for an opening in a container, said closure being adapted for movement between a closed position occluding said opening and an open position spaced from said opening, said closure comprising:

a body for being mounted to said container, said body comprising a first, generally rigid piece which is molded from a first material, said body having a top deck portion and a skirt portion depending from the periphery of said top deck portion; and a second piece which is molded from a second material onto said first, rigid piece and bonded to said first, rigid piece to define a portion of the periphery of the exterior of said closure, said second material being softer than said first material, said second piece defining an exterior region for being contacted by at least one of the user's fingers when the user grasps the closure, said exterior region including at least alternating narrow and wide portions on said skirt portion around the periphery of said body skirt portion adjacent said top deck portion, said wide portions each extending from said top deck portion on said skirt portion lower than said narrow portions to define finger-engaging regions separated by exposed surface regions of said first material which define outwardly projecting ribs which can be engaged by an automatic capping machine in applying the closure to a container.

2. The closure in accordance with claim 1 in which said closure is a separate structure that is free of any element connecting said closure to said container so that said closure can be completely removed from said container.

3. The closure in accordance with claim 1 in which said first, rigid piece has an exterior side and an interior side; and said second piece also includes at least one branch portion extending through said first, rigid piece from said exterior side to said interior side and also includes an interior portion that extends from said branch portion on said interior side to define a seal for sealingly engaging said container around said opening when said closure is in said closed position.

4. The closure in accordance with claim 1 in which said first, rigid piece is molded from a thermoplastic material; and said second piece is molded from a rubber-based, thermoplastic elastomer.

5. The closure in accordance with claim 1 in which said second piece has a color which differs from the color of said first, rigid piece.

6. The closure in accordance with claim 1 in which said skirt portion defines an internal female thread for threadingly engaging a mating external male thread on said container.

7. The closure in accordance with claim 1 in which said second piece is molded from a thermoplastic elastomer;

said deck portion includes an inner surface that faces toward said container opening and that is circumscribed by said skirt portion; and said closure further includes a generally annular member which is molded as a third piece from a thermoplastic elastomer onto said inner surface of said first, rigid piece adjacent said skirt portion to define a seal for sealingly engaging a portion of said container around said opening.

* * * * *